No. 623,169. Patented Apr. 18, 1899.
W. L. MARBLE.
TOOL HANDLE FASTENING.
(Application filed Aug. 13, 1898.)
(No Model.)
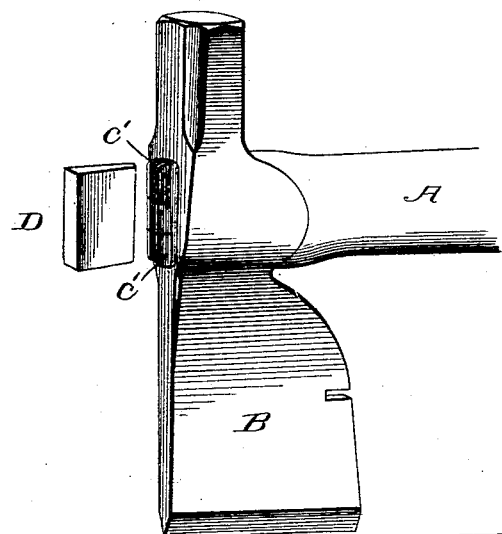
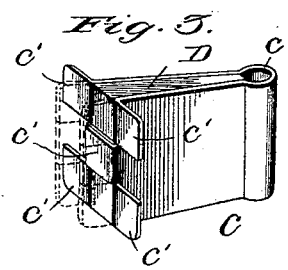
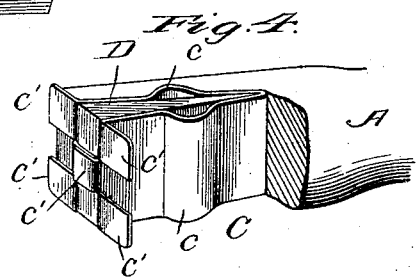
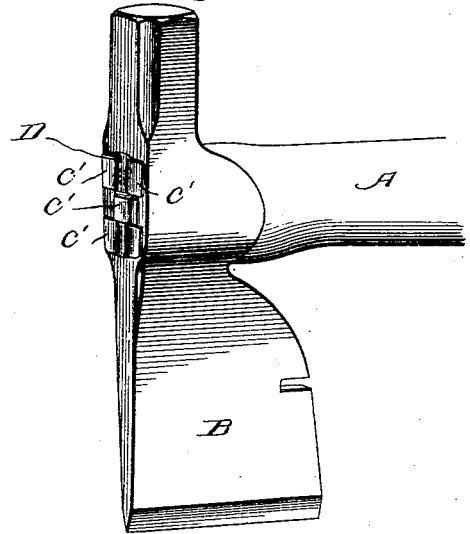
Witnesses
Inventor
Webster L. Marble,
Attorney

UNITED STATES PATENT OFFICE.

WEBSTER L. MARBLE, OF GLADSTONE, MICHIGAN, ASSIGNOR OF ONE-HALF TO FRANK H. VAN CLEVE, OF ESCANABA, MICHIGAN.

TOOL-HANDLE FASTENING.

SPECIFICATION forming part of Letters Patent No. 623,169, dated April 18, 1899.

Application filed August 13, 1898. Serial No. 688,479. (No model.)

*To all whom it may concern:*

Be it known that I, WEBSTER L. MARBLE, a citizen of the United States, residing at Gladstone, in the county of Delta and State of Michigan, have invented certain new and useful Improvements in Tool-Handle Fastenings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to tool-handles, and its object is to provide a safe and efficient fastening for securing a handle to a hammerhead, hatchet, or the like.

My improved fastening consists of a strip of sheet metal, preferably steel, inserted into a slot in the end of the handle, where it is retained by its peculiar shape. The handle is then inserted into the eye of the tool-head and a wedge driven in to spread it tightly therein. The projecting end of the fastener is then turned down upon the ends of the wedge and the handle.

In the accompanying drawings I have shown one mode of carrying my invention into effect; but I wish it understood that I do not limit myself to the precise species therein shown.

Figure 1 shows a hatchet with the handle in place and one of my fasteners in the end of the handle, the wedge being ready to be driven in. Fig. 2 shows the wedge driven in and the ends of the fastener turned down. Fig. 3 shows the fastener and wedge. Fig. 4 shows a modification of the same.

The handle A is of any suitable size and shape, its end being fitted, as usual, to the eye in the head B of the tool, which is here represented as a hatchet. Near the end of the handle is bored a transverse hole, and a slot is cut lengthwise in the handle from its end to or beyond said hole.

The preferred form of fastener C is a metallic strip of suitable width and thickness for the weight of the tool. This strip is folded to form two branches or arms diverging at an acute angle. At or near the fold the fastener is provided with means for retaining it in the slot, such as a rib $c$, to engage with the transverse hole in the handle. The rib is made, preferably, by curving the metal outwardly, as shown. In Fig. 3 the ribs unite into a nearly circular enlargement $c'$ at the junction of the two arms of the fastener. In Fig. 4 the ribs are about midway between the ends of the fastener.

The fastener is of such a length that when in place in the slot its ends will project beyond the head B. These ends are slit lengthwise into three or more flanges $c''$.

The fastener is slid sidewise into the slot in the handle with the ribs received in the transverse hole therein, whereby the fastener is securely held against endwise removal from said slot. The head of the tool having been put on the handle, the outer flanges are turned down upon the end thereof and against the end of the tool-head. A wooden or metallic wedge D is then driven into the slot between the arms of the fastener, spreading the fastener and the handle to a tight fit in the eye of the tool. The remaining flanges are then turned down upon the end of the wedge to prevent it from working out. The advantage of this construction is that if the handle shrinks the head of the tool cannot fly off, since it is held by the outer flanges. Moreover, the wedge can be driven in still farther and followed up by bending over more of the flanges, so that the head and the handle can be kept always firmly united.

Having thus described my invention, what I claim, and desire to secure by Letters Patent, is—

1. The combination with a tool-handle, having a lengthwise slot at or near the middle of one end, of a fastener retained in said slot, and provided with a flange to be folded down upon the head of the tool, substantially as described.

2. The combination with a tool-handle having a lengthwise slot and a transverse hole, of a fastener retained in said slot and having a rib engaging with said hole and a flange adapted to be folded down upon the head of the tool, substantially as described.

3. The combination with a tool-handle having a lengthwise slot, of a fastener consisting of a doubled strip retained in said slot, a wedge between the arms of the fastener, and flanges on the fastener folded down on the head of the tool and on the wedge, substantially as described.

4. The combination with a tool-handle, of a fastener consisting of a doubled strip having transverse ribs engaging with said handle, a wedge between the arms of the fastener, and flanges on the fastener adapted to be folded down on the head of the tool and on the wedge, substantially as described.

5. A fastener for tool-handles, consisting of a strip of metal C, doubled at an acute angle, and having outwardly-projecting ribs, and slit at its ends to form flanges $c''$, substantially as described.

In testimony whereof I affix my signature in presence of two witnesses.

WEBSTER L. MARBLE.

Witnesses:
RAYMOND BOUTON,
CHAS. H. SCOTT.